(12) United States Patent
Simon et al.

(10) Patent No.: US 8,159,475 B2
(45) Date of Patent: Apr. 17, 2012

(54) DEVICE FOR PROVIDING A VEHICLE USER WITH INFORMATION

(75) Inventors: Julien Simon, Munich (DE); Timo Gnugesser, White Plains, NY (US); Joerg Kolitsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 931 days.

(21) Appl. No.: 11/875,406

(22) Filed: Oct. 19, 2007

(65) Prior Publication Data
US 2008/0094313 A1   Apr. 24, 2008

Related U.S. Application Data

(63) Continuation of application No. PCT/EP2005/004371, filed on Apr. 22, 2005.

(51) Int. Cl.
   *G09G 5/00* (2006.01)
   *G06F 3/033* (2006.01)
(52) U.S. Cl. .......................... 345/184; 345/156
(58) Field of Classification Search .............. 345/7–9, 345/156–158, 160, 168, 184, 660, 671, 472.2, 345/473; 715/830, 831, 856–861, 792; 701/29
   See application file for complete search history.

(56) References Cited

U.S. PATENT DOCUMENTS

| | | | |
|---|---|---|---|
| 5,270,689 A | 12/1993 | Hermann | |
| 5,936,613 A * | 8/1999 | Jaeger et al. | 345/172 |
| 6,154,201 A * | 11/2000 | Levin et al. | 345/184 |
| 6,452,570 B1 | 9/2002 | Kuenzner | |
| 7,489,303 B1 * | 2/2009 | Pryor | 345/173 |
| 2002/0063714 A1 * | 5/2002 | Haas et al. | 345/473 |
| 2002/0198635 A1 | 12/2002 | Obradovich et al. | |

FOREIGN PATENT DOCUMENTS

| | | |
|---|---|---|
| DE | 38 36 555 A1 | 5/1990 |
| DE | 103 41 471 A1 | 8/2004 |
| EP | 0 980 782 B1 | 2/2000 |

OTHER PUBLICATIONS

International Search Report dated Dec. 29, 2005 with English Translation (Four (4) pages).

* cited by examiner

*Primary Examiner* — Kevin M Nguyen
(74) *Attorney, Agent, or Firm* — Crowell & Moring LLP

(57) ABSTRACT

In a device for providing information to a vehicle user about various functional elements using a display screen system, having an overview image to display the functional elements, having a rotating actuator, which is assigned to the functional elements, rotatable arbitrarily around its axis for the individual selection of the functional elements, and having the property of displaying further information about the particular functional element using an axial movement of the actuator, the functional elements are marked in the overview image. The functional elements are individually selectable by a rotational movement of the actuator and an enlarged detail of the overview image containing the particular functional element is displayable as the information.

11 Claims, 4 Drawing Sheets

DEVICE FOR PROVIDING A VEHICLE USER WITH INFORMATION

CROSS-REFERENCE TO RELATED APPLICATIONS

This application is a continuation of PCT International Application No. PCT/EP2005/004371,filed on Apr. 22, 2005, the entire disclosure of which is expressly incorporated by reference herein.

BACKGROUND AND SUMMARY OF THE INVENTION

The present invention relates to a device for providing a vehicle user with information about various functional elements using a display screen system. The device includes an overview display image for representing the functional elements and a rotating actuator, which is rotatable arbitrarily about its axis in order to individually select the functional elements. The device is capable of displaying further information about the particular functional element using an axial movement of the actuator.

A device of this type is known from EP 980 782 B1 (having U.S. counterpart U.S. Pat. No. 6,452,570 B1). The actuator is rotatable clockwise and counterclockwise about its longitudinal axis and deflectable transversely to the longitudinal axis. The size of the image detail displayed in the window is adjustable by the rotational movement of the actuator and the position of the window within the display screen is adjustable by the transverse movement of the actuator. In addition, detent positions are provided for the rotational movement of the actuator. The enlargement factor for an image detail is assigned to each detent position. Operating instructions assigned to the functional element may be displayed on the display screen by executing an axial movement of the actuator.

In addition, a device for informing a vehicle user about various functional elements using a display screen system is known from DE 38 36 555 A1 (having U.S. counterpart U.S. Pat. No. 5,270,689). Menu-type image information is controlled using a rotary actuator provided with detent positions. The hierarchical function structure, which includes menu, submenu, and functions, is selected using the actuator and assigned image information is shown on a display screen. The actuator is primarily used for navigating through the function structure. The displayed image information results as a consequence of the particular selected node point of the functional hierarchy and essentially includes the title of the particular selected node point.

The present invention provides a device of the above-mentioned type, in which the displayable image information is tailored more closely to the information needs of the vehicle user.

The present invention provides a device for informing a vehicle user about various functional elements using a display screen system. The device includes an overview display image for representing the functional elements and a rotating actuator, which is rotatable arbitrarily about its axis in order to individually select the functional elements. The device is capable of displaying further information about the particular functional element using an axial movement of the actuator. The functional elements are marked in the overview display image and the functional elements are individually selectable by a rotational movement of the actuator. An enlarged detail of the overview display image containing the particular functional element is displayable as the information.

The actuator is again primarily used for controlling the display screen such that the functional element and subsequently associated visual information are selectable using the actuator. This information is displayed as an enlarged detail of the previously displayed overview display image, similarly to a zoom function.

This zooming may be executed multiple times in sequence. For example, starting from an overview display image of the vehicle interior, the area around the steering wheel is "zoomed in on", and subsequently the steering column switch contained therein is displayed enlarged. An auxiliary switch situated thereon may subsequently also be shown enlarged.

It is important for the selection of the functional element that is ultimately of interest (here, the auxiliary switch), which is executed step-by-step via an axial movement of the actuator, that the context, i.e., the particular image environment, is maintained and thus remains recognizable to the vehicle user. Each image is contained in the associated overview image selected previously in the sequence.

Sequential images differ essentially only by the enlargement factor and the size of the overall image detail shown. However, it is also possible to still enlarge the information mediation of the particular image in that additional graphic or text information is overlaid onto the particular image, as needed.

If the functional elements in the overview image are "approached" in sequence by rotating the actuator and the relevant image location is selected by locking the actuator in position, furthermore, its title or an informative graphic may be displayed with its image. It is also possible to provide several of these display forms simultaneously, for example, to display both the title and also the image of the functional element.

A further improvement of the display and thus the understanding for the position and operability of the particular functional element results if it is visually emphasized upon setting the detent position.

If a description of the function triggerable using the functional element is additionally displayed upon setting a detent position, further improvement of the user friendliness results.

The possibility of additionally displaying a video sequence to explain the function triggerable using the function element upon setting a detent position is used for the same purpose.

If the user recognizes that he has erred or if he does not wish to activate the information about the particular functional element for another reason, the possibility of displaying the overview image again upon an arbitrary operating command is a significant help for him. He may thus reach the prior overview image again. For example, a running film sequence is immediately interrupted. This may be achieved, for example, by a separate "back" button or by a back function, which is selectable like a functional element and activatable by axial movement of the actuator.

In the scope of the present invention, both reversible pressing inward and also corresponding pulling outward come into consideration as axial movements for the actuator. In both cases, the subsequent information obtained is intuitively supported. If the actuator is pressed inward, the user more or less penetrates deeper into the functional element. If the information obtained is tied to pulling out the actuator, the user more or less extracts this information from the functional element.

In addition, the image information may also be supplemented by acoustic information. For example, the mode of operation of the functional element may be explained.

Other objects, advantages and novel features of the present invention will become apparent from the following detailed description of the invention when considered in conjunction with the accompanying drawings.

DETAILED DESCRIPTION OF THE DRAWINGS

FIGS. 1-4 show the sequence of a virtual tour conducted with a few manipulations of a rotary actuator in order to provide a simple aid to a vehicle user for operating a cruise control system in the vehicle.

Figure 1:
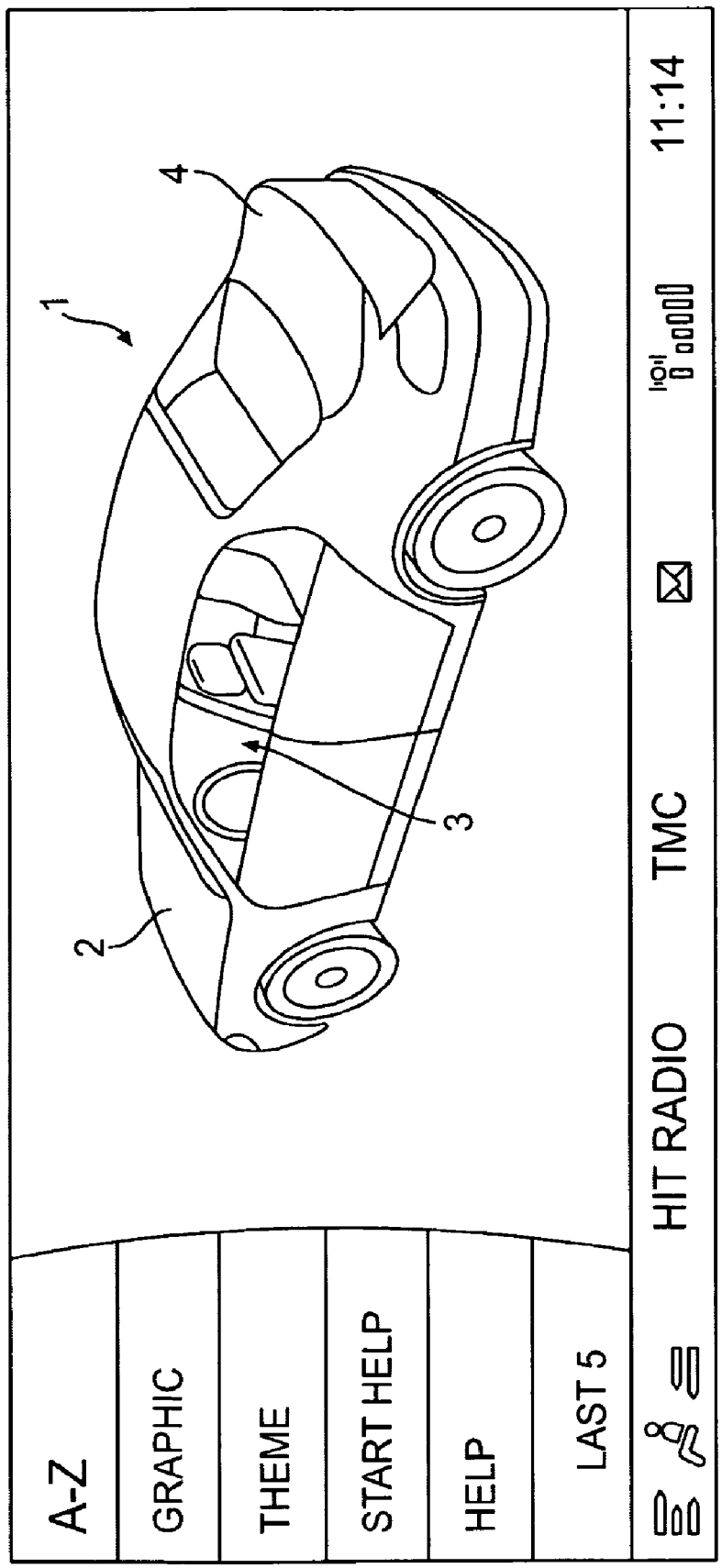
FIGS. 1-4 sequentially illustrate an exemplary operation of the present invention in order to illustrate the operation of a cruise control system to a vehicle user in a motor vehicle.

Starting from FIG. 1, in which a motor vehicle 1 is shown on a display screen in a perspective view, three areas of the motor vehicle may be visually emphasized from one another, triggered by an axial movement of a turn-push actuator (also referred to as "controller" in the following), known from DE 38 36 555 A1: the engine hood 2, the vehicle interior 3, and the hatchback 4. The vehicle areas 2, 3, and 4 are individually selectable by a turn-lock movement of the actuator. If one area is selected, (here, the vehicle interior 3), then the display image changes upon the axial movement of the actuator and a view of the vehicle interior 3 appears (see FIG. 2).

Figure 2:
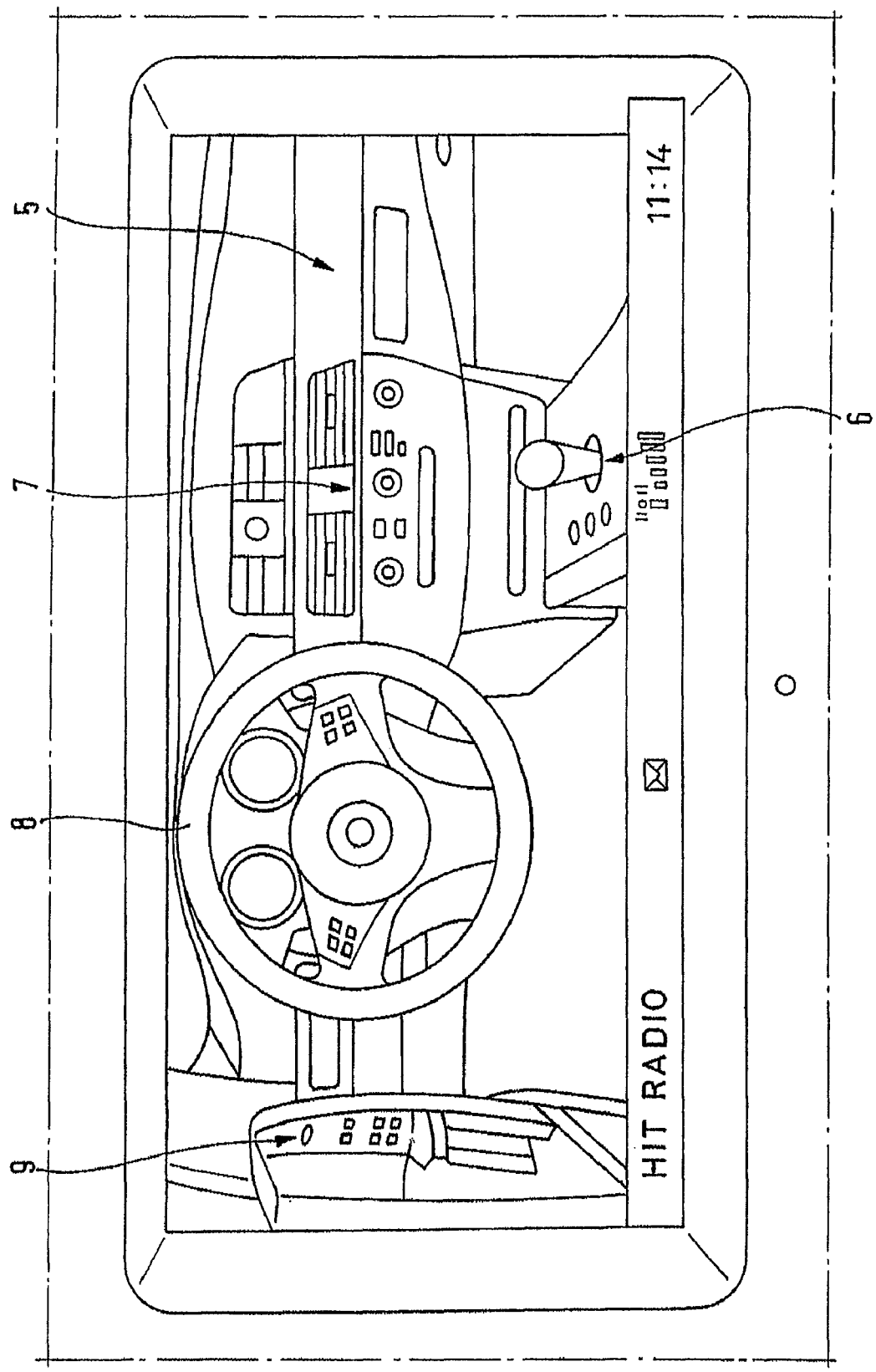

Referring to FIG. 2, various areas of the vehicle interior are optically differentiated from one another—or will be after a further axial movement of the actuator: the passenger's dashboard area 5, the gearshift console 6, the operating panel 7 of the heating and air-conditioning system (not shown further), the steering wheel area 8, and the switch panel 9 on the driver side door.

The areas 5 through 9 are individually selectable by a turn-lock movement of the actuator. With respect to this example, the area 8 is selected here. The area 8 thus appears next in an enlarged illustration through an axial movement of the actuator (see FIG. 3).

Figure 3:
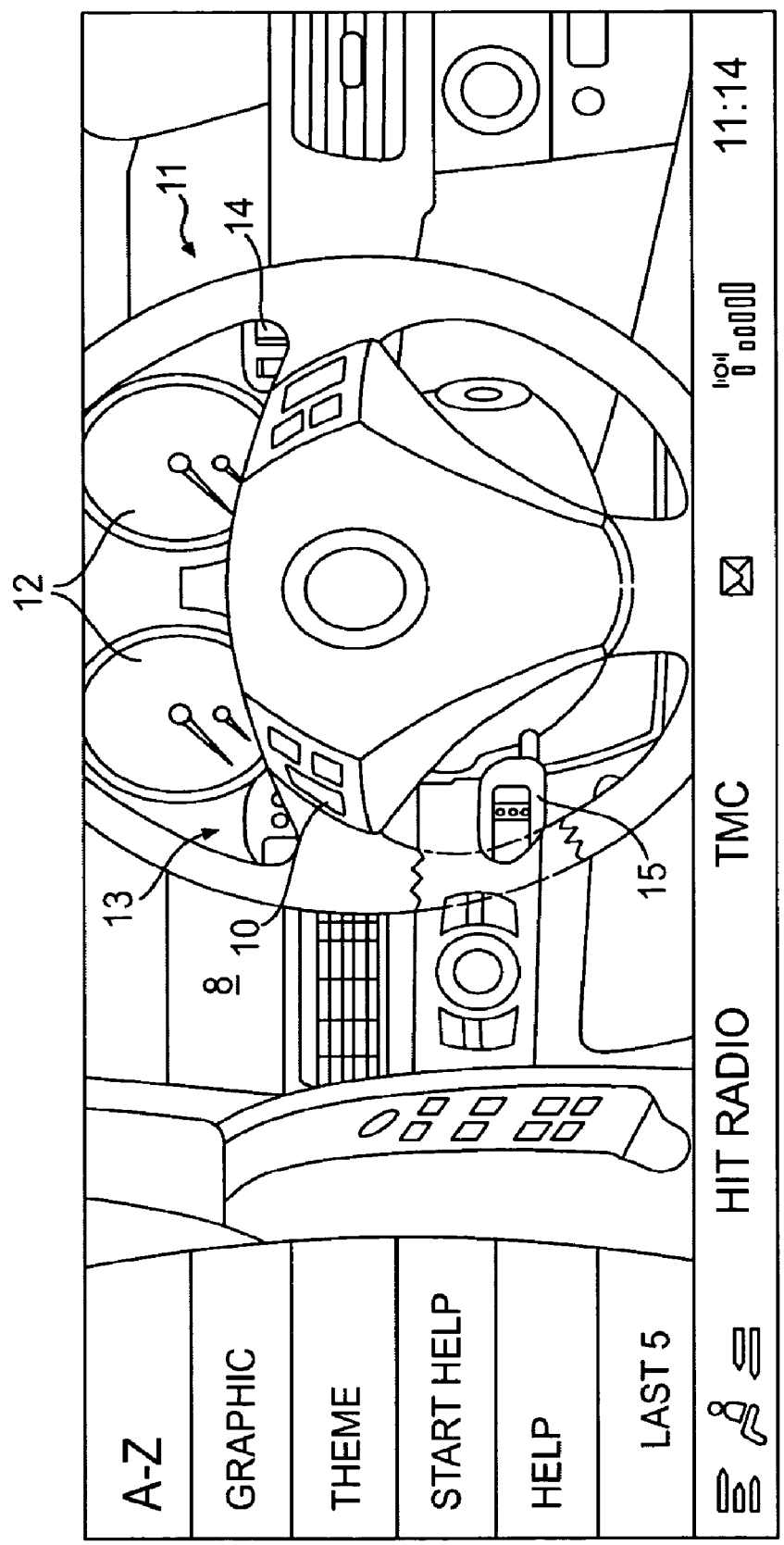

With respect to FIG. 3, the individual functional elements are visually emphasized and selectable by turning/locking the actuator: the left steering wheel function switch panel 10, the right steering wheel function switch panel 11, the instrument cluster 12, the cleaning function lever 13, the turn signal indicator 14, and the cruise control actuator 15. In addition, an associated brief description, e.g., "cruise control" may appear in the image or next to it similar to a "help bubble" upon selection of these functional elements 10-15.

Figure 4:
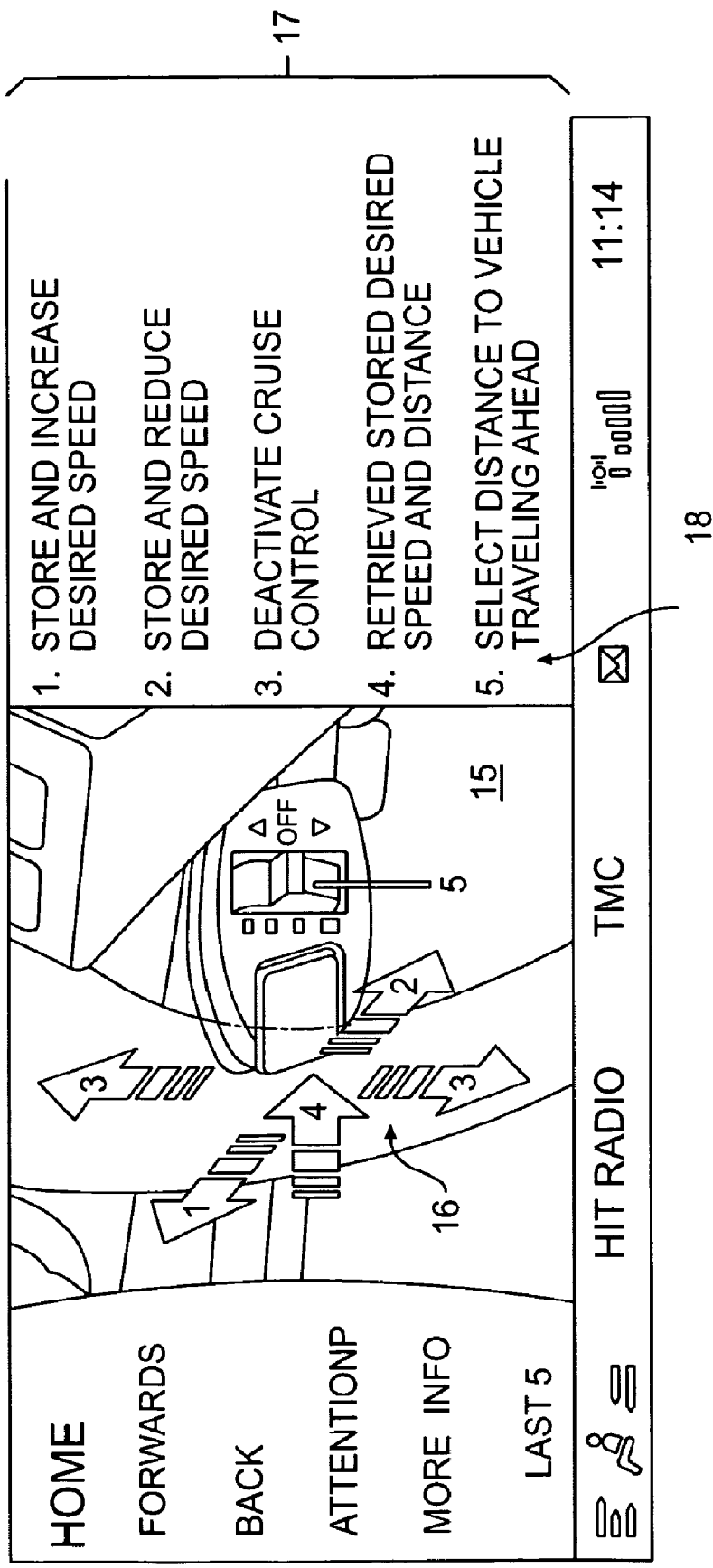

If the cruise control actuator 15 is selected next, then after an axial movement of the actuator, the enlarged image shown in FIG. 4 appears in association with a graphic 16 to explain the setting capabilities of the cruise control actuator 15, as well as an explanation 17 of the five various operating capabilities, identified by 1, 2, . . . 5.

The possibility exists here of selecting one of the explanations 1, 2, . . . 5 by turning/locking the actuator and receiving more detailed explanations on the display screen 18 by a further axial movement of the actuator (not shown).

It is also possible at any time to "jump back" into the preceding image. A return key is used for this purpose, which may also be operated multiple times in sequence.

Furthermore, the panels A-Z, graphic, theme, start help, and "last 5" are shown on the left edge of the display screen. These are various entrance possibilities into the EBA ("electronic operation guide"). The panels may be selected by turning and pressing the controller.

By selecting one of the panels, the following are reached:

A-Z: One reaches a keyword search. An alphabet allows letters to be selected. Subsequently, the themes starting with the same letters are listed. The more letters that are input, the fewer themes match the input, i.e., the selection becomes precise. A special theme may be found rapidly by the keyword search.

Graphic: If the desired theme may not be named, it may be found via a graphic illustration of the vehicle. Various areas may be marked on the display screen by rotating the controller and subsequently selected by pressing the actuator. The desired theme may thus be delimited and made more precise in a following menu.

Theme: The individual themes are divided into headings here, e.g., driving tips or communication. If one selects a heading, one reaches the associated themes and may thus enter deeper and deeper into the EBA, until the desired theme is reached.

Start help: The brief overview of the vehicle is found here. Above all, it is shown here what is found in the vehicle and which function is concealed behind the various buttons and levers around the steering wheel. In addition, basic principles of individual operating functions, e.g., BMW's iDrive, are briefly explained.

Last 5: The last five retrieved themes of the EBA are listed here and may be selected again without renewed searching.

Upon selection of the engine hood area 2 or the hatchback area 4, the user receives corresponding information about the position and operation of the various refilling devices for operational and consumption materials and/or the position and operation of the vehicle components situated in the trunk.

In this way, the vehicle user receives information about the individual functional elements of the vehicle optimally tailored to his needs on the display screen.

Accordingly, a method and device are provided for informing a vehicle user about various functional elements using a display screen system. An overview display represents the functional elements. A rotatable actuator is associated with the functional elements and arbitrarily rotatable about its axis in order to individually select the functional elements. Additional information about a respective functional element is capable of being displayed upon an axial displacement of the actuator. The method and device operate by highlighting the functional elements in the overview display. A particular functional element is individually selected by rotating the actuator. Information about the individually selected functional element can be displayed as an enlarged section of the overview display, which section incorporates the respective functional element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for providing a vehicle operator with information about various functional elements, the device comprising:
   a display screen system in a motor vehicle having a display screen that displays an overview image, wherein the overview image graphically depicts a plurality of vehicle areas corresponding to the functional elements;
   a rotatable actuator in the motor vehicle operatively coupled with the display screen system, the actuator being rotatable by the vehicle operator arbitrarily about its axis in order to individually select the plurality of vehicle areas; and wherein the plurality of vehicle areas are highlighted in the overview image and are individually selectable by the rotational movement of the actuator, and further wherein the information provided to the vehicle operator is an enlarged detail of a portion of the overview image containing the individually selected vehicle area and corresponding functional element, the enlarged detail being displayed on the display screen and said corresponding functional element triggers a function performed by the motor vehicle when selected by the vehicle operator.

2. The device according to claim 1, wherein the rotatable actuator includes detent positions, and further wherein the individually selected vehicle area is visually emphasized upon setting a detent position.

3. The device according to claim 2, wherein a title of the functional element corresponding to the individually selected vehicle area is displayed upon setting the detent position.

4. The device according to claim 2, wherein a description of the function assigned to the functional element corresponding to the individually selected vehicle area is displayed upon setting the detent position.

5. The device according to claim 3, wherein a description of the function assigned to the functional element is displayed upon setting the detent position.

6. The device according to claim 2, wherein a video sequence explaining the function triggerable using the functional element is displayed upon setting the detent position.

7. The device according to claim 3, wherein a video sequence explaining the function triggerable using the functional element is displayed upon setting the detent position.

8. The device according to claim 4, wherein a video sequence explaining the function triggerable using the functional element is displayed upon setting the detent position.

9. The device according to claim 1, wherein a preceding overview image is again displayed upon actuating an operating command.

10. A method for providing information to a vehicle operator about various functional elements using a display screen system and a rotatable actuator of a motor vehicle, the method comprising the acts of:

providing an overview image on a display screen of the display screen system in the motor vehicle, wherein the overview image graphically depicts a plurality of vehicle areas corresponding to the functional elements, wherein the plurality of vehicle areas are highlighted in the overview image;

individually selecting, by the vehicle operator, from among the plurality of vehicle areas in order to access a functional element via a rotational movement of the motor vehicle's rotatable actuator; and providing an enlarged detail of a portion of the overview image containing the individually selected vehicle area and corresponding functional element on the display screen, and wherein said corresponding functional element triggers a function performed by the motor vehicle when selected by the vehicle operator.

11. The method according to claim 10, wherein the act of providing an enlarged detail of the portion of the overview image further comprises the act of axially moving the rotatable actuator after individually selecting a vehicle area corresponding to the functional element in order to display the enlarged detail of the portion of the overview image.

* * * * *